US009250312B1

(12) United States Patent
Knibbe et al.

(10) Patent No.: US 9,250,312 B1
(45) Date of Patent: Feb. 2, 2016

(54) HIGH ALTITUDE RADIO FREQUENCY POSITIONING SYSTEM

(75) Inventors: Peter W. Knibbe, Philadelphia, PA (US); John B. Stetson, New Hope, PA (US); Walter K. Feldman, Smithtown, NY (US); Robert L. Aarons, Brooklyn, NY (US); Rex Bennett, Haddon Township, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 543 days.

(21) Appl. No.: 13/204,532

(22) Filed: Aug. 5, 2011

(51) Int. Cl.
*G01S 5/14* (2006.01)
*G01S 5/16* (2006.01)
*B64G 1/36* (2006.01)

(52) U.S. Cl.
CPC ............... *G01S 5/163* (2013.01); *B64G 1/361* (2013.01)

(58) Field of Classification Search
CPC ...... B64G 1/361; G01C 21/025; G06T 7/004; G06T 7/0042
USPC ............................ 342/357.2, 357.21; 701/513
See application file for complete search history.

(56) References Cited

U.S. PATENT DOCUMENTS

| 6,275,677 | B1 * | 8/2001 | Tandler | 455/12.1 |
| 7,418,343 | B1 | 8/2008 | McGraw et al. | |
| 8,767,072 | B1 * | 7/2014 | Rosenwinkel | 348/148 |
| 2007/0038374 | A1 * | 2/2007 | Belenkii et al. | 701/222 |
| 2011/0077863 | A1 * | 3/2011 | Brace | 701/208 |

OTHER PUBLICATIONS

Brown, Alison et al. "Navigation Using LINK-16 GPS-INS Integration," Proc. of ION GPS 2003, Sep. 2003. pp. 1-7.*
Ozimek, Igor et al "Navigation-Related Services Over Stratospheric Platforms," Electrotechnical Review 71(3): pp. 96-102. 2004.*
Kopp, Carlo, "Milestones: Stellar Navigation to Satellite Navigation," AirPowerAustralia, Defence Today, pp. 60-61, Mar./Apr. 2007.*
Tappe, J. "Development of Star Tracker Systems for Accurate Estimation of Spacecraft Attitude," Naval Post Graduate School, Dec. 2009.*
Kandiyil, R. "Attitude Determination Software for a Star Sensor," Master Thesis, University of Wurzburg, Sep. 2009, pp. 1-75.*
Ju, G. et al, "Overview of Star Tracker Technology and Its Trend in Research and Development," John L. Junkins Astrodynamics Symposium, May 2003, pp. 1-18.*

(Continued)

*Primary Examiner* — Gregory C Issing
(74) *Attorney, Agent, or Firm* — Howard IP Law Group, PC

(57) ABSTRACT

A method and system for determining the geolocation of a vehicle in the absence of a GPS signal includes determining the geodetic position of each of a plurality of airborne objects based on the relative position of at least one star and at least one satellite. The determined geodetic positions of each of the airborne objects is transmitted to the vehicle. A distance from the vehicle to each airborne vehicle is calculated. Based on the geodetic position determined for each airborne object and the distance from the vehicle to each of the airborne objects, the geodetic position of the vehicle is determined. A receiver receives the geodetic position of each airborne object, calculates a distance to each airborne object, and determines a current geodetic position based on the received geodetic positions of the airborne objects and the distance from the vehicle to each airborne object.

19 Claims, 6 Drawing Sheets

(56) References Cited

OTHER PUBLICATIONS

King, A.D., "Inertial Navigation—Forty Years of Evolution", pp. 140-149, GEC Review, vol. 13, No. 3, 1998.

Brown, Alison, "Navigation Using LINK-16 GPS-INS Integration", pp. 1-7, Proceedings of ION GPS, 2003, Sep. 2003.

* cited by examiner

HIGH ALTITUDE RADIO FREQUENCY POSITIONING SYSTEM

FIELD OF THE INVENTION

This application relates to geodetic positioning systems.

BACKGROUND OF THE INVENTION

It is often necessary for many military and nonmilitary purposes to know the geolocation of a movable platform or vehicle. Precise geolocation data is typically provided via a global positioning systems (GPS) using satellites that orbit the earth. However, it is recognized that a GPS signal may not always be available. The GPS signal may be blocked due to environmental conditions, equipment failure, or through a hostile action that jams the GPS signals and/or prevents their detection/determination at a GPS receiver. Alternative systems and methods for accurately determining geolocation of a vehicle by means other than GPS are desired.

SUMMARY

A method for determining the geolocation of a vehicle in the absence of a GPS signal includes determining the geodetic position of each of a plurality of airborne objects based on the relative position of at least one star and at least one satellite. The determined geodetic positions of each of the airborne objects are transmitted to the vehicle for which the geolocation is being determined. A distance from the vehicle to each airborne object is calculated. Based on the geodetic position determined for each airborne object and the distance from the vehicle to each of the airborne objects, the geodetic position of the vehicle is determined.

According to an embodiment, a system for determining the geolocation of a vehicle includes a processor, a memory in communication with the processor, and a receiver in communication with the processor and the memory. Communication data representing the geodetic position of each of a plurality of airborne objects is received by the receiver. The received geodetic positions are determined by each of the plurality of airborne objects based on the relative positions of at least one star and at least one satellite. The processor is configured to process the received geodetic positions and calculate a distance from the vehicle to each of the plurality of airborne objects. Based on the distances to each of the airborne objects and their corresponding geodetic positions, the processor is further configured to determine the current geodetic position of the vehicle.

DETAILED DESCRIPTION

Figure 1:
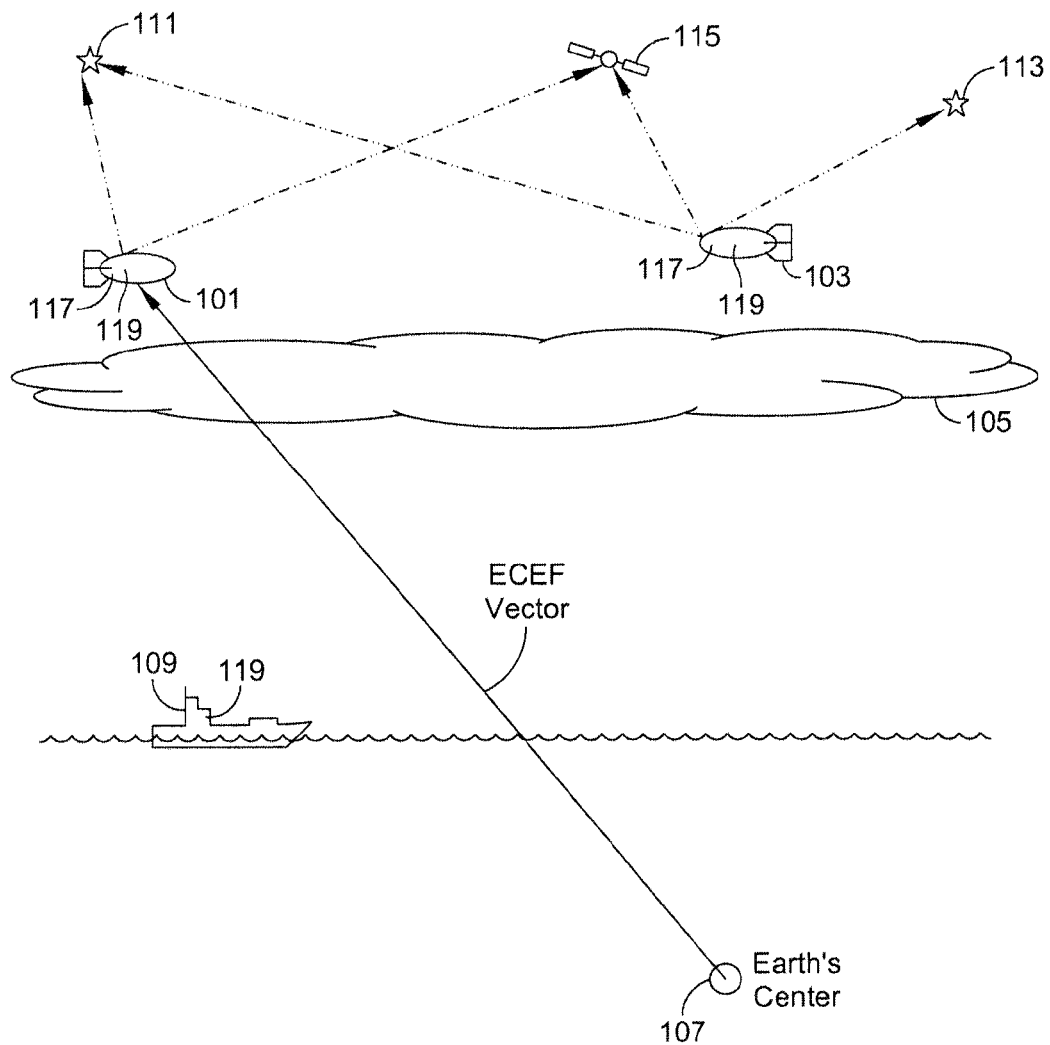
FIG. 1 is an illustration of a positioning system for a high altitude airship using star tracking.

It is to be understood that the figures and descriptions of the present invention have been simplified to illustrate elements that are relevant for a clear understanding of the present invention, while eliminating, for purposes of clarity, many other elements found in typical global positioning system. However, because such elements are well known in the art, and because they do not facilitate a better understanding of the present invention, a discussion of such elements is not provided herein. The disclosure herein is directed to all such variations and modifications known to those skilled in the art.

In the following detailed description, reference is made to the accompanying drawings that show, by way of illustration, specific embodiments in which the invention may be practiced. It is to be understood that the various embodiments of the invention, although different, are not necessarily mutually exclusive. Furthermore, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout several views.

Vehicles such as naval ships rely on knowledge of their geographic location for navigation and tactical function. Navigation systems have been developed which provide high precision navigation based on known landmarks. For example, navigation using the relative position of the stars to a fixed point on land or the horizon while at sea may provide positioning information that allow for accurate navigation. Global positioning systems (GPS) utilize a number of orbiting GPS satellites which transmit a GPS signal toward the Earth where the signals may be detected by a compatible GPS receiver. The GPS signal carries information about the satellite sending the signal and other information including but not limited to the timing and phase information relating to the signal. The signals from multiple GPS satellites are received and the precise location of the GPS receiver may be determined through triangulation.

GPS signals are used for a variety of military and commercial applications. Accordingly, GPS may be an attractive target for enemy actions during conflict. GPS disruptions (e.g. jamming) may impair a vehicle's ability to continuously update its current position through GPS signal reception.

Stellar tracking systems may be used to determine the geodetic position of a terrestrial vehicle (e.g. a ship) relative to the ephemerides of stars. The stars and their current location in the sky may be detected using electro-optical sensors that detect the infrared light emitted by the stars. However, the sensors require a direct line of sight to the stars. Therefore, the sensors may be unable to detect the light emitted from the stars in atmospheric conditions that adversely affect visibility, such as smoke, fog and clouds.

Many ships are equipped with inertial navigation systems (INS) that provide navigational control. Inertial navigation may use dead reckoning to determine current location based on an initial known position. The initial known position is input into the INS system. An inertial measurement unit (IMU), having a number of motion sensors, detects movement of the ship relative to at least three axes. For example, the IMU may include at least one accelerometer to detect linear or translational motion, and at least one gyroscope for detecting rotational movement. Starting with the known initial position, the ship's position may be updated continuously or periodically based on movement measurements received from the IMU. Hybrid systems have been developed which utilize multiple technologies, for example, GPS and INS, to provide precise positioning information, even when one of the technologies is temporarily unavailable. For example, a last received GPS signal may be used to determine a given position (e.g. last known position). The last known position may then be entered into the INS as an initial reference point to allow the INS to provide updated position information in the absence of a GPS signal.

INS provides accurate positioning information for a certain time period. However, INS is subject to small motion measurement errors due to conditions, such as calibration and/or drift inaccuracies. Because each updated position is based on the last calculated position, these small errors are cumulative and result in a positioning error that increases rapidly with the length of time since the last known location was entered into the INS.

Additional relative positioning is also available through data link communication systems such as a joint tactical information distribution system (JTIDS). Each vessel in, for example, a carrier group may be equipped with a JTIDS unit (JU). Each JU is a member of a family of radio equipment which implements a secure communications protocol. For example the JU's may use a secure protocol also known as LINK 16. LINK 16 is a time division multiple access (TDMA) communications system that provides anti-jamming and secure communications between compatible participants through the implementation of frequency hopping, spread spectrum and other secure communication methods. The LINK 16 protocol defines message types, including a precise participant location and identification (PPLI) message that is broadcast from each JU to other JU's within communications range. LINK 16 signals further contain precise timing information that is inherent in a TDMA system which may be used to determine precise time of arrival (TOA) and round trip times (RTTs) for messages sent between JU's. Processing methods such as radar altimetry processing may be used to calculate range information between JTIDS participants based on the RTT of the LINK 16 communications and the sender location information found in the PPLI. While the embodiments described herein utilize LINK 16 for communication, it is to be understood that other communication methods capable of securely communicating at least position information among participants may be used in conjunction with a suitable algorithm for incorporating ranging information into a navigation solution such as a position and velocity Kalman filter, by way of non-limiting example.

According to an embodiment described herein, at least two high altitude (e.g. stratospheric) airships may be equipped with electro optical stellar navigation systems and JTIDS. While the embodiments described herein are in reference to airships, it is to be appreciated that any suitable airborne object (e.g. weather balloon) configurable to include an electro optical stellar navigation system and a communications system such as JTIDS or other communications system for communication between the airborne objects and another vehicle may be used.

In one embodiment, the airships are deployed at an altitude sufficient to provide an uninterrupted view of stars and satellites in all types of conditions (e.g. above the clouds). Due to their generally high altitude, the airships may further be protected from threats such as surface to air missile systems (SAMS). Each of a plurality of airships determines its geodetic position based on the relative position between at least one visible star and at least one visible satellite. Each of the airships transmits its determined geodetic position to a terrestrial vehicle over a suitable (non-GPS) data communication link. It should be noted that a terrestrial vehicle may be any vehicle operating at or near the Earth's surface including, by way of non-limiting example, ocean vessels, ground-based vehicles and low flying aircraft operating at or below a given altitude.

The terrestrial vehicle is configured to include a navigation processor and a (non-GPS) data communication system for use with a high altitude RF positioning system (HARPS) that includes star tracking algorithms implemented in a plurality high altitude airborne objects. The communications system providing communications between the terrestrial vehicle and the plurality of airborne objects over a secure (non-GPS) data communications link. The communications system of the terrestrial vehicle is in communication with a navigation solution capable of determining the current geodetic position of the terrestrial vehicle which may in turn be used for navigation. The communications system may be a communications system that includes a built in navigation function, for example LINK 16, or the communications system may be in signal communication with a navigation processor which receives transmitted geodetic information from the communications system and determines the current geodetic position of the terrestrial vehicle and updates an auxiliary navigation solution, for example a position and velocity Kalman filter.

The navigation processor receives a signal indicative of the geodetic position of each of the plurality of airborne objects and is configured to calculate the distance between the vehicle and each of the plurality of airborne objects. Using the transmitted geodetic positions and the corresponding distances between the vehicle and the airships, the processor is configured to determine a current geodetic position of the vehicle. For example, the current geodetic position of the vehicle may be determined through triangulation. The airships may be positioned relative to the terrestrial vehicle below to aid the calculation of the current geodetic position of the vehicle. By way of example, a first airship may be positioned ninety degrees (90°) relative to a second airship from the perspective of a terrestrial vehicle (e.g. a surface ship) below. Each airship determines its precise geodetic position based on a diurnal star tracker (DST) which calculates the airship's position by referencing at least one visible star and at least one orbiting satellite visible in the sky from the perspective of each high altitude airship. Each of the plurality of airships determines its precise geodetic position without the use of a GPS signal.

The geolocation of each airship may be transmitted to the surface ship below via a secure communication, for example, through JTIDS using, for example, LINK 16. According to an embodiment, each airship is configured to communicate with the surface ship by transmitting a LINK 16 PPLI message containing the precise location of the airship and timing information (e.g. time of arrival, round trip time) relating to the PPLI message. The PPLI message further includes an identifier that identifies the airship transmitting the PPLI message.

The geodetic position may be characterized as a set of coordinates. By way of example, the set of coordinates may correspond to the latitude, longitude and altitude of the airship transmitting the PPLI message. When the PPLI message is received by the JTIDS receiver associated with the surface ship, the geodetic position and identifier are extracted from the PPLI message and may be stored in a memory. A navigation processor associated with the surface ship is in operable communication with the memory and determines the distance between the surface ship and the transmitting airship.

As previously discussed, the transmission of the geodetic position information may be accomplished by means of a communication link between the terrestrial vehicle and the plurality of airships. According to an embodiment, the non-GPS communication link may be implemented in a JTIDS, using a protocol such as LINK 16. LINK 16 includes a built-in navigation filter which may be configured to compute distances between the terrestrial vehicle and the plurality of airships and determine the geodetic position of the terrestrial vehicle based on the transmitted geodetic position of each of the plurality of airships. For instance, the distance may be calculated based on the time required for a PPLI message to travel from the transmitting airship to the receiving terrestrial vehicle (e.g. surface ship). The PPLI message is transmitted as an RF electromagnetic wave, therefore it travels substantially at the speed of light. The distance may be calculated from the arrival time of the message and the geodetic position received in the PPLI message.

In another embodiment, a non-GPS communications link between a plurality of airships and a terrestrial vehicle is established. Each airship includes at least a transmitter for transmitting communication signals via the non-GPS communication link. The terrestrial vehicle (e.g. surface ship) includes at least a receiver for receiving communication signals from the airships via the communications link. Each airship determines its geodetic position data based on the relative position of at least one star and at least one satellite. The determined geodetic position of each of the plurality of airships is transmitted to the terrestrial vehicle via the communication link. The transmitted geodetic position is received by the receiver in the terrestrial vehicle. The received geodetic position information may be stored in a memory within the communication system of the terrestrial vehicle or may be processed directly from the output of the receiver.

The terrestrial vehicle further includes a navigation processor including a computer processor and a memory in communication with the processor. The navigation processor receives the transmitted geodetic position information from the communications system (e.g. receiver) of the terrestrial vehicle. The navigation processor is configured to calculate the distance between the terrestrial vehicle and each of the plurality of airships. The distance may be calculated based on the time required for the communication message transmitted by the airship to reach the receiver and the velocity at which the communication message is propagated. For example, if the communication message is transmitted via an RF carrier, the velocity of the communication message is substantially the speed of light. The arrival time of the message may be compared to a timestamp carried in the message to determine the elapsed time of transmission. To synchronize the transmitter and receiver, an interrogation message and reply message may be exchanged between transmitter/receiver pairs at each of the plurality of airships and the terrestrial vehicle to determine a round trip time for a communication message. The timing information and the velocity of the message may be used to calculate the distance between the receiver and the originating transmitter. The navigation processor may use the geodetic position information and the calculated distances between the terrestrial vehicle and at least two transmitting airships to determine the current geodetic position of the terrestrial vehicle. By way of example, triangulation may be used to determine the current geodetic position of the terrestrial vehicle based on the geodetic position of at least two airships in communication with the terrestrial vehicle.

FIG. 1 is an illustration of a positioning system for high altitude airships 101, 103 using diurnal star tracking system 117. A first airship 101 and a second airship 103 are configured to operate at high altitudes, for example, an altitude above the cloud layer 105. The first airship 101 and second airship 103 may be similarly equipped for determining their geodetic positions with respect to a reference point such as the Earth's center 107. Each of airships 101, 103 include a star tracking system 117 for determining the geodetic position of the airship 101, 103 based on the relative position of at least one star and at least one satellite visible to the airship 101, 103. Each airship 101, 103 also includes a communications system 119. Each airship communication system 119 is configured to provide a communication link between the corresponding airship 101, 103 and other participants equipped with a compatible communication system 119, such as surface ship 109. Surface ship 109 includes a communications system 119 compatible with the communications system in each of the airships 101 103. In an exemplary configuration, communication system 119 includes a transmitter and a receiver for providing two-way communication between participants having communication system 119.

The airships 101, 103 may operate at an elevation above a surface ship 109 and may be in communication with each other and surface ship 109 through a communications link. For example, communications between first airship 101, second airship 103 and surface ship 109 may be provided through an anti-jamming communication protocol such as LINK 16 as part of a joint tactical information distribution system (JTIDS). At altitudes higher than the airships 101, 103 there are other celestial bodies such as stars 111, 113 and satellite 115. Satellite 115 may be travelling in an orbit around the Earth. The airships 101, 103 are positioned above the level of the clouds 105, as to maintain a clear and unobstructed view of stars 111, 113 and satellite 115. In addition to providing a persistent unobstructed view of stars 111, 113 and satellite 115, the generally high altitude attained by airships 101, 103 provide the airships 101, 103 with protection from possible hostile actions, such as attack from a surface-to-air missile system (SAMS).

In one configuration, one or both of airships 101, 103 determines its global position with high precision using at least one star 111 and at least one satellite 115. By way of example, with reference to airship 101, an electro-optical/infrared (EOIR) sensor (not shown) is included therein. Airship 103 may be similary configured. The EOIR sensor is configured to detect infrared light emitted from stars and energy reflected from satellite 115 and to render the detected objects in an image.

Figure 2:
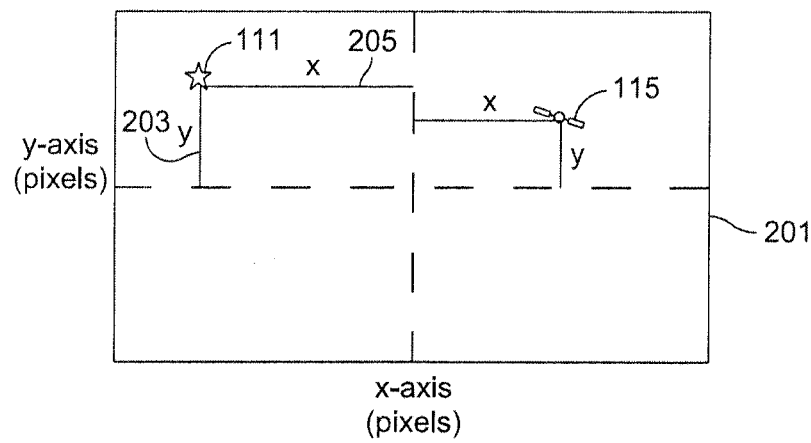
FIG. 2 is an illustration of an image captured by a star tracking system.

The airship 101 is equipped with an EOIR sensor that captures an image (shown in FIG. 2, 201) containing one star 111 and one satellite 115 as depicted in FIG. 2. A pixel offset is determined relative to the EOIR sensor frame. A y offset 203 and an x offset 205 are determined with respect to star 111. Similarly, x and y offsets are determined for satellite 115 with respect to the EOIR frame. The x and y offsets define the imaged objects in terms of elevation and azimuth. A line of sight vector $S^{sensor}$ is calculated according to Equation 1:

$$S^{sensor} = [\sin(Az_{sensor})\cos(El_{sensor})\cos(Az_{sensor})\cos(El_{sensor})\sin(El_{sensor})]$$

Equation (1)

In an embodiment where airship 101 uses one star for reference, a vector for a "synthetic" star is calculated based on the assumption that the synthesized star is positioned 90° from star 111. The observed star 111 and the synthesized star are the basis for determining an attitude triad for the sensor. The vectors representative of the actual star 111 ($S_1$) and the arbitrary synthetic star ($S_A$) are used to compute an attitude triad for the sensor according to Equation 2:

$$M^{sensor} = [S_1^{sensor} S_1^{sensor} \times S_A^{sensor} S_1^{sensor} \times (S_1^{sensor} \times S_A^{sensor})] \quad \text{Equation (2)}$$

The synthetic star's vector is transformed from the sensor frame to an earth centered, earth fixed (ECEF) frame based on knowledge of the sensor's orientation relative to the airship 101 and the airship's 101 attitude and position. In an embodiment, the sensor mounting system may provide this information. Using the ECEF ephemeris vector for the observed star 111 and the calculated ECEF vector for the synthetic star, an attitude triad for the ECEF frame may be calculated according to Equation 3:

$$M^{ECEF} = [s_1^{ECEF} s_1^{ECEF} \times s_A^{ECEF} s_1^{ECEF} \times (S_1^{ECEF} \times S_A^{ECEF})] \quad \text{Equation (3)}$$

A rotation matrix is then computed between the sensor attitude and the ECEF attitude triad according to Equation 4:

$$R_{sens}^{ECEF} = (M^{ECEF})^T M^{sens} \quad \text{Equation (4)}$$

The rotation matrix is then used to rotate the vector of the observed satellite 115 in the sensor frame to a vector in ECEF according to:

$$U_{fromship}^{ECEF} = R_{sens}^{ECEF} U^{sensor} \quad \text{Equation (5)}$$

The airship 101 location may then be calculated using the satellite 115 ephemeris in ECEF and the ECEF vector from the satellite 115 to the ship according to:

$$X^{ECEF} = U^{ECEF} U_{fromship}^{ECEF} \quad \text{Equation (6)}$$

Figure 3:
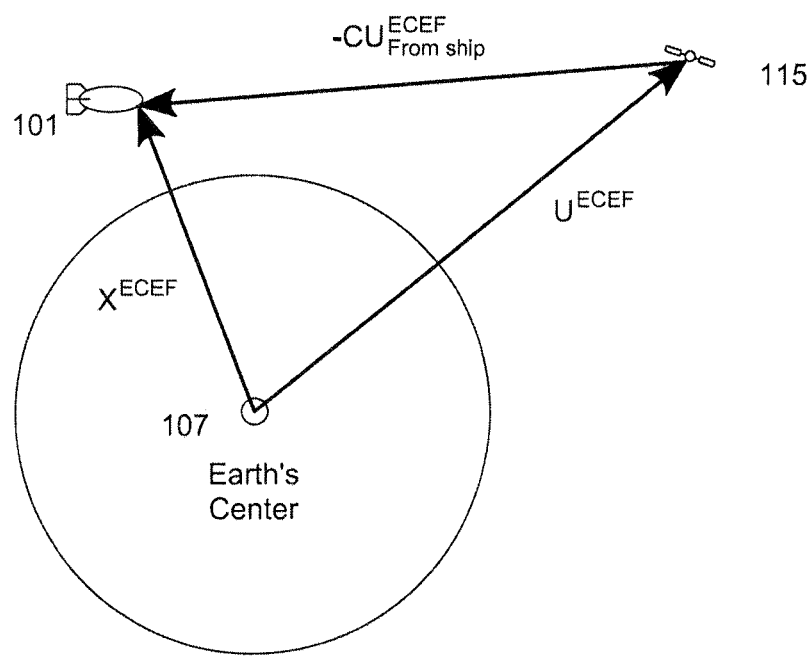
FIG. 3 is a diagram showing the calculation of an earth-centered, earth-fixed position vector of a high-altitude airship according to an exemplary embodiment.

This calculation is illustrated in FIG. 3.

Airship 103 may be similarly configured to airship 101 and may determine its geodetic position as described above with regard to airship 101.

Referring again to FIG. 1, airship 103 and/or airship 101 determines its global position using the relative position of two stars 111, 113 and one satellite 115 according to another method of determining the geodetic position of an airship. Airship 103 may determine its geodetic position using images captured by airship 103 of two stars 111, 113 and satellite 115. In a manner similar to that described above with regard to airship 101, the ECEF vector to airship 103 may be calculated according to images captured by the EOIR sensor of airship 103. According to an embodiment of airship 103, airship 103 captures two images. A first image contains one of stars 111, 113. By way of example, airship captures a first image containing star 113. In addition to star 113, the first image also contains satellite 115. A second image is captured by airship 103 containing the second star, in this example, star 111. The line of sight vector is determined for each object in the first and second images according to Equation 1 based on the pixel coordinates of the object. Because the first and second images are captured at different times, the sensor reference frame for the first image is different than the sensor reference frame for the second image. A series of rotational matrices applied to the line of sight vector ($S_{113}$) for star 113 may be used to transform $S_{113}$ from its own sensor frame to the sensor frame of the first image containing star 111 and satellite 115. Once transferred to the sensor frame of the first image, the second star 113 may be treated like the synthetic star in the example described above. An attitude triad is constructed for the first image sensor frame according to Equation 2. The ECEF vectors for the observed stars 111, 113 are then used to calculate an attitude triad for the ECEF frame according to Equation 3. A rotation matrix from the sensor frame to the ECEF is then calculated according to Equation 4 and used to convert the satellite 115 vector to a vector from the airship 103 to the satellite 115 according to Equation 5 to arrive at the airship 103 position using Equation 6.

In another embodiment, one or both of airships 101, 103 may be configured so as to capture at least three images, a first image containing one of the stars 111, 113, a second image containing satellite 115, and a third image containing the other star. In this embodiment, the sensor frames for the first and third images are merged in the second image containing satellite 115. Subsequent processing proceeds similarly as described above to derive the airship 103 position.

Figure 4:
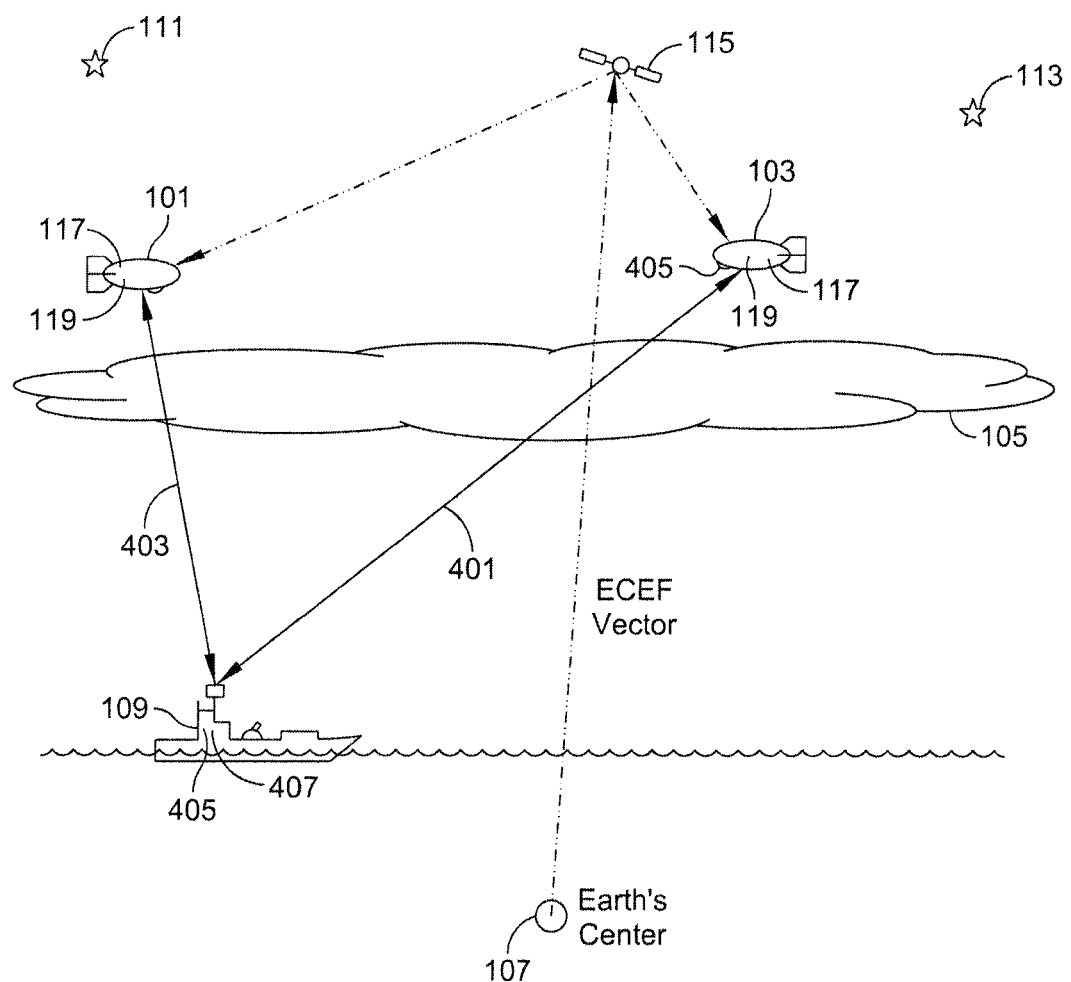
FIG. 4 is a diagram of a high altitude radio frequency positioning system (HARPS) according to an exemplary embodiment.

Referring to FIG. 4, a high altitude radio frequency positioning system that operates completely independent of GPS signals is illustrated. High altitude airships 101, 103 are deployed at an altitude above the highest cloud level 105. Airships 101, 103 may be any type of airborne object capable of operating at an altitude above the clouds 105. For example, airships 101, 103 may be an unmanned vehicle, such as a blimp or balloon, or may be any suitable airborne object capable of hosting a star tracking position system 117 and a communications system 119. Each of a plurality of airships 101, 103 includes a star tracking system 117 for determining the geodetic position of the airship 101, 103. The star tracking system 117 determines the geodetic position of the corresponding airship 101, 103 based on the relative position of at least one star 111, 113 and at least one satellite 115. For example, airships 101, 103 may be equipped with a diurnal star tracking system (DST). The DST includes electro-optical sensors that detect infrared light emitted from stars and satellites in the sky. Because the airships 101, 103 are deployed above cloud level 105, a persistent unobstructed view of the stars is available to the airships 101, 103 at all times. The DST captures images of the sky including detected stars and satellites. Based on a pixel offset of the objects in the captured image, a sensor frame is calculated and converted to an ECEF vector that is used to determine the sensor's position relative to the Earth's center 107 as described with respect to FIG. 1.

Each airship 101, 103 includes a communication system 119 configured to transmit data corresponding to its determined geodetic position to another communication participant via the communication system 119. For example, surface ship 109 may include a compatible communication system 119 which allows the surface ship 109 to communicate with airship 101 and/or airship 103. By way of example, airships 101, 103 and surface ship 109 may be equipped with a JTIDS communication system which allows participants to securely communicate with one another. The JTIDS may use a protocol such as LINK 16 which defines a PPLI message containing identification and precise location information about the transmitting participant. The airships 101, 103 securely communicate their position to a terrestrial vehicle, (e.g. surface ship 109. The secure communication may take place through JTIDS utilizing a LINK 16 protocol as indicated by bi-directional non-GPS communication links 401 and 403. These messages, in particular, the exchange of the PPLI messages allow the JTIDS receivers to determine the distance between one another. Through a built-in navigation filter, for example the RELNAV function of LINK 16, triangulation techniques may be used by surface ship 109 based on the multiple determined positions (e.g. the airships 101, 103 positions) to determine its location (i.e. location of surface ship 109). As is understood, the LINK 16 terminal includes RELNAV, an automatic function of the LINK 16 terminal which is used to determine distance between terminals by measuring the arrival times of transmissions and correlating them with the reported positions provided in a PPLI message. If two or more terminals have independent, accurate knowledge of their geodetic positions, RELNAV may provide JU's in the network with accurate geodetic positions. In this way, the precise geodetic position of each unit may be known to all other participants. Accordingly, airships 101 and 103 are configured to acquire accurate knowledge of their geodetic positions, and this information may be provided in a PPLI message to surface ship 109, which receives and processes the position data associated with the two of more airships to determine its own position.

LINK 16 provides a secure high capacity, jam-resistant, nodeless data link which is well suited for providing communications between surface ship 109 and the airships 101, 103. Airships 101, 103 determine their precise geodetic position, for example, their latitude, longitude and altitude. The latitude, longitude and altitude may be represented as a set of coordinates that are transmitted as part of a PPLI message. This allows positions anywhere in the world to be reported with high precision. LINK 16 is based on TDMA communications, which requires accurate time synchronization between communicating transmitters and receivers. Round trip timing (RTT) messages are communicated between participants to update synchronization information. A transmitting participant transmits a RTT interrogation message from a transmitter to a recipient participant's receiver. Upon receiving the RTT interrogation message, the recipient participant transmits an RTT reply message. Based on the time the reply message is received, the transmitting participant may calculate the time it took for the RTT messages to make the round trip from the transmitting participant to the recipient and then back again. Each participant is assigned predetermined time slots in which the participant transmits and/or receives communications The round trip time information may be used to synchronize communications between participants so that messages arrive synchronized to a predetermined time slot in which the recipient will be listening to receive communications.

According to another embodiment, surface ship 109, may further include an inertial navigation system (INS) 405, capable of calculating a current position of surface ship 109 based on an initial given position input to the INS, and the integration of subsequent movement measurements of surface ship 109. Movements are measured by a number of sensors contained in an inertial measurement unit (IMU) that detect movement and rotation through instrumentation such as accelerometers and gyroscopes. Measurement errors occur when updating a current position (e.g. due to gyroscope drift). However, these small measurement errors are cumulative and develop into positioning errors. The positioning errors grow rapidly with the length of time elapsed since the last known position was input. Surface ship 109 includes a communications system 119 which is configured to receive communication messages containing geodetic position information from each of airship 101 and airship 103 via non-GPS communication links 403 and 401, respectively. The communication messages are received at surface ship 109 by a receiver within communications system 119 and may be stored or processed by the communications system 119. The communications system is in communication with navigation processor 407 which receives the geodetic position information of each the airships 101, 103 and calculates a distance between the surface ship 109 and each of the airships 101, 103 based on time information associated with the communication messages transmitted/received over the non-GPS communications link. The distance and geodetic position information of airships 101, 103 is used to determine the current geodetic position of surface ship 109. Surface ship 109 may use the current geodetic position as input to a navigation solution such as a position and velocity Kalman filter, or may be used to provide a updated reference point for an inertial navigation system 407 which allows the inertial navigation system 407 to reset cumulative position errors, such as errors associated with gyroscope drift.

Figure 5:
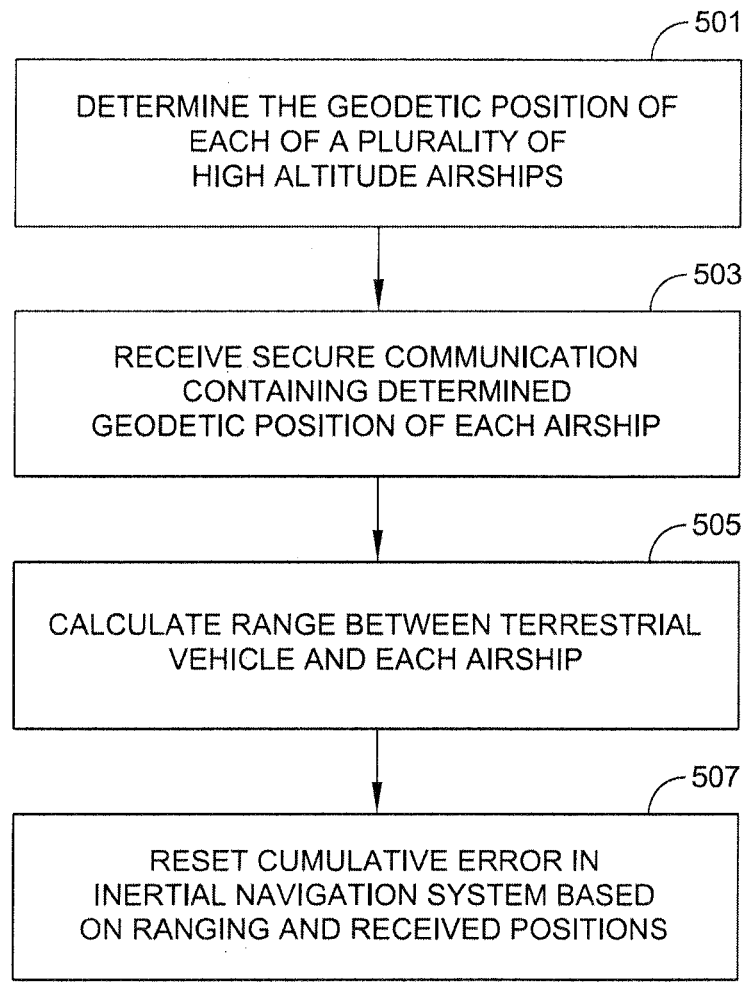
FIG. 5 is a process flow for using a HARPS to reset errors in an inertial navigation system according to an exemplary embodiment.

FIG. 5 is a process diagram of a method for providing precise global position in the absence of a GPS signal according to an exemplary embodiment. The method begins with determining an ECEF position of a plurality of high altitude airships 501. The airships are deployed at an altitude above the clouds which allows for a continuous unobstructed view of the sky. Using star tracking position systems, a precise ECEF position for the airship is determined. The positioning information of the plurality of airships is received via a non-GPS secured communication 503. The secured communication may be transmitted as part of a JTIDS using LINK 16 communications protocol. By way of example, the secured communication may include a PPLI message. The communication is processed by the shipboard receiver and processor to calculate the range between the surface ship and each of the plurality of airships 505. The ranging (i.e. distance) and geodetic position information is used to reset accumulated errors of a shipboard INS 507. By resetting cumulative errors, a precise updated position may be calculated for extended periods without the aid of GPS technology.

Figure 6:
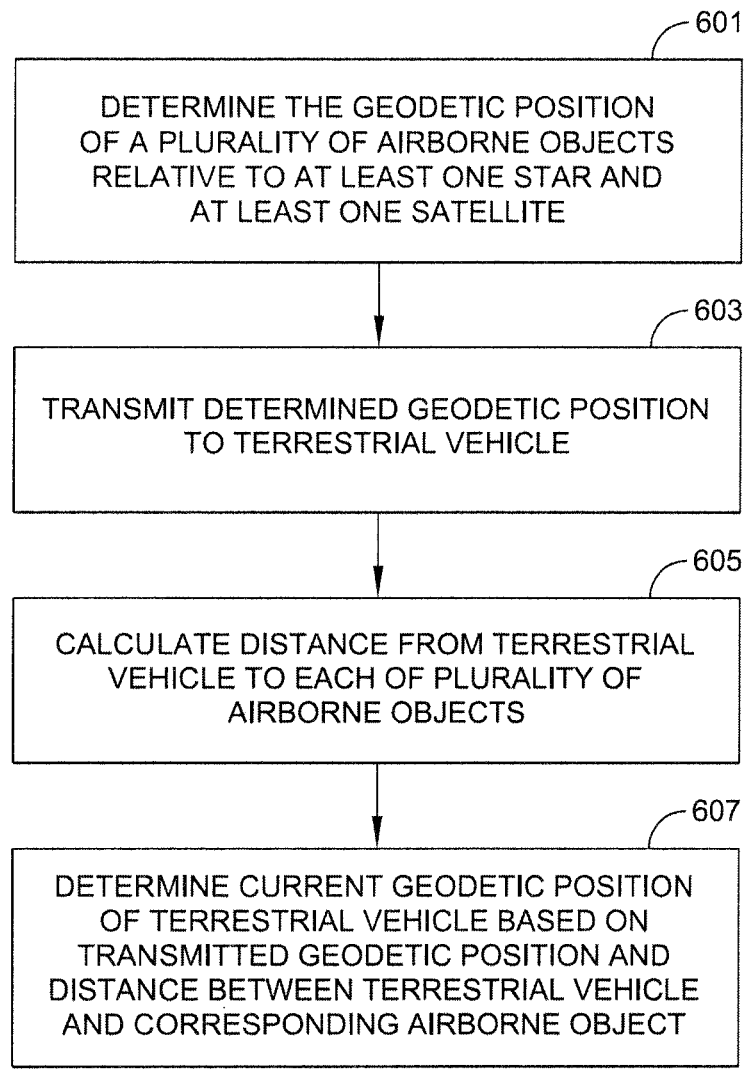
FIG. 6 is a process flow for determining a current geodetic position of a terrestrial vehicle according to an exemplary embodiment.

FIG. 6 is a process diagram depicting a method for determining the current geodetic position of a terrestrial vehicle according to an exemplary embodiment. A plurality of airborne objects (e.g. airships or balloons) are deployed at an altitude sufficient to provide a persistent unobstructed view of stars and satellites in the sky. The geodetic position of each of the plurality of airborne objects is determined based on the relative position of at least one star and at least one satellite 601. The determined geodetic position of each of the plurality of airborne objects is transmitted to a terrestrial vehicle 603. Based on the geodetic position transmitted to the terrestrial vehicle and the arrival time of the received communication containing the geodetic position information, the distance between the terrestrial vehicle to each of the plurality of airborne objects is calculated 605. Using the distance between the terrestrial vehicle and each of the plurality of airborne objects, and the corresponding geodetic position of each of the plurality of airborne objects, the current geodetic position of the terrestrial vehicle is determined 607. The current geodetic position of the terrestrial vehicle may be determined, for example through triangulation using the determined geodetic positions of each airborne object and the calculated distance between the terrestrial vehicle and each of the airborne objects to determine the current geodetic position of the terrestrial vehicle.

Figure 7:
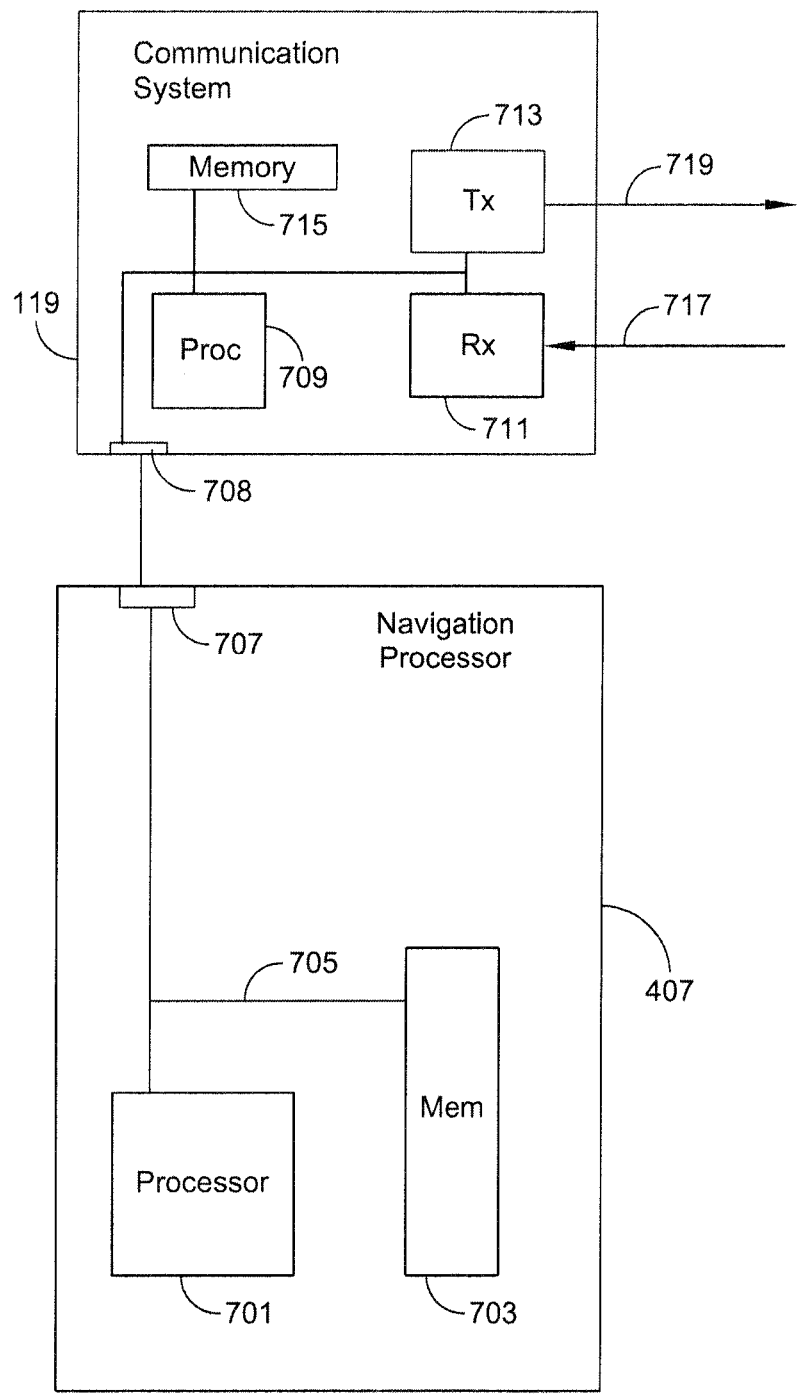
FIG. 7 is a block diagram of a navigation processor and communications system associated with a terrestrial vehicle useful in implementing a HARPS according to an exemplary embodiment.

FIG. 7 is a block diagram of the navigation processor 409 shown in FIG. 4. The navigation processor 409 includes a processor 701 in communication with a memory 703 through a data communications bus 705. Navigation processor 409 communicates with non-GPS communication system 119 through communications port 707 of the navigation processor 409 and a communications port 708 of the communications system 119. The communications system 119 includes a transmitter 713 and a receiver 711 for sending and receiving communication messages. For example, receiver 711 may be configured to receive incoming communication messages 717. The incoming communication message 717 may be transmitted from an airborne object such as airships 101, 103 shown in FIGS. 1 and 4. The incoming communication message 717 contains the geodetic position of the transmitting entity and an identifier to indicate the entity sending the incoming communication message 717. Transmitter 713 is configured for transmitting outgoing communication message 719 to other receivers. The transmitter 713 and receiver 711 are in communication with a memory 715 and a processor 709. Memory 715 which may store instructions and/or data that are processed by the processor 709. Navigation processor 409 may be configured to perform calculations to determine the distance between the communication system 119 receiver 711 and the transmitting participant. Navigation processor 409 includes a processor 701 which may be configured to process instructions stored in memory 703 and are operative to cause the processor 701 to determine the geodetic position of the navigation processor 409 based on information provided by the communications system 119 processor 709 via communications ports 708 and 707.

While the foregoing describes exemplary embodiments and implementations, it will be apparent to those skilled in the art that various modifications and variations can be made to the present invention without departing from the spirit and scope of the invention.

What is claimed is:

1. A method for determining the geolocation of a vehicle, the method comprising:
    determining at each of a plurality of airborne objects, and independently of a satellite transmission signal, a geodetic position for each of said plurality of airborne objects based on a relative position of at least one star and at least one satellite, wherein determining the geodetic position of each airborne object comprises the steps of:
        capturing, by a sensor on said airborne object, an image containing at least a first observed star and at least a first observed satellite;
        generating in said image, a second synthetic star having a line of sight (LOS) vector from said sensor that is at 90 degrees relative to said first observed star;
        using said second synthetic star and ephemeris of said first observed star to generate a rotation matrix, applying the rotation matrix to a line of sight vector from said sensor to said first observed satellite to calculate an ECEF vector to said first observed satellite; and
        determining the geodetic position of the airborne object based on the line of sight vector and the ECEF vector to said first observed satellite;
    transmitting from each of said plurality of airborne objects said determined geodetic positions to said vehicle over a non-satellite based navigation communications link;
    calculating a distance from said vehicle to each of said plurality of airborne vehicles based on data received by said vehicle over said non-satellite based navigation communications link; and
    determining by a processor, a current geodetic position of said vehicle based on said determined geodetic positions of said plurality of airborne objects and said calculated distances from said vehicle to each of said airborne objects.

2. The method according to claim 1, wherein said current geodetic position of said vehicle is determined using triangulation.

3. The method according to claim 1, further comprising positioning said plurality of airborne objects at a stratospheric altitude.

4. The method according to claim 1, wherein said transmitted geodetic position of each of said plurality of airborne objects includes a set of coordinates, said coordinates corresponding to latitude, longitude and altitude.

5. The method according to claim 1, wherein said determined geodetic positions for said plurality of airborne objects are transmitted using a LINK 16 communication message.

6. The method according to claim 5, wherein said LINK 16 communication message comprises a precise participant location and identification (PPLI) message.

7. The method according to claim 1, wherein said distance between said vehicle and each of said plurality of airborne objects is calculated based on timing information associated with a communication message containing said determined geodetic positions of each of said plurality of airborne objects.

8. A system for determining a precise geolocation of a terrestrial vehicle, said system comprising:
    a plurality of airborne objects, each airborne object including a processor, and each airborne object positioned at a stratospheric altitude and configured to determine its geodetic position based on a relative position of at least one star and at least one satellite wherein determining the geodetic position of each airborne object comprises the processor of the airborne object performing the steps of:
        receiving from a sensor on said airborne object, an image containing at least a first observed star and at least a first observed satellite;
        generating in said image, a second synthetic star having a line of sight (LOS) vector from said sensor that is at 90 degrees relative to said first observed star;
        using said second synthetic star and ephemeris of said first observed star to generate a rotation matrix, applying the rotation matrix to a line of sight vector from said sensor to said first observed satellite to calculate an ECEF vector to said first observed satellite; and
        determining the geodetic position of the airborne object based on the line of sight vector and the ECEF vector to said first observed satellite;
    a processor;
    a memory in communication with said processor;
    a receiver in communication with said processor and said memory, said receiver configured to receive via a non-satellite based navigation communications link, a communication message containing geodetic position information from each of said plurality of airborne objects positioned at said stratospheric altitude, the geodetic position information based on a relative position from the airborne object to at least one star and at least one satellite;
    wherein said processor is configured to calculate a distance between said terrestrial vehicle and each of said plurality of airborne objects based on said non-satellite based navigation communication message and determine a current geodetic position of said terrestrial vehicle based on said received geodetic positions of said airborne objects and said calculated distances between said terrestrial vehicle and each of said plurality of airborne objects.

9. The system according to claim 8, wherein said current geodetic position of said vehicle is determined through triangulation.

10. The system according to claim 8 wherein said communication message is a LINK 16 communication message.

11. The system according to claim 10, wherein said LINK 16 communication message comprises a precise participant location and identification (PPLI) message.

12. The system according to claim 8, wherein said processor is further configured to determine the distances between said terrestrial vehicle and each of said plurality of airborne vehicles based on timing information associated with said communication message from each of said plurality of airborne objects.

13. A method of determining a global position of a vehicle, the method comprising the steps of:
- positioning a plurality of airborne objects at a stratospheric altitude, wherein each airborne object is equipped with a stellar navigation system, said stellar navigation system comprising an electro-optical/infrared (EOIR) sensor for detecting infrared light energy emitted by stars or reflected by satellites;
- determining geolocation information for each said airborne object using said stellar navigation system, wherein determining said geolocation information of each airborne object comprises the steps of:
  - capturing, by said EOIR sensor, an image containing at least a first observed star and at least a first observed satellite;
  - generating in said image, a second synthetic star having a line of sight (LOS) vector from said EOIR sensor that is at 90 degrees relative to said first observed star;
  - using said second synthetic star and ephemeris of said first observed star to generate a rotation matrix, applying the rotation matrix to a line of sight vector from said EOIR sensor to said first observed satellite to calculate an ECEF vector to said first observed satellite; and
  - determining the geolocation information of the airborne object based on the line of sight vector and the ECEF vector to said first observed satellite;
- and wherein determining said global position of said vehicle comprises:
  - receiving the geolocation information from each said airborne object at a terrestrial vehicle operating independently of any satellite system transmission over a non-satellite based navigation communications link; and
  - determining the geolocation of said terrestrial vehicle based on the received geolocation information and distances between the terrestrial vehicle and each of the airborne objects determined using data obtained over the non-satellite based navigation communications link.

14. The method according to claim 13, further comprising:
resetting a cumulative error of an inertial navigation system of said vehicle based on the determined geolocation of said vehicle.

15. The method of claim 1, further comprising:
resetting a cumulative error of an inertial navigation system of said vehicle based on the determined geolocation of said vehicle.

16. The method according to claim 8, further comprising:
resetting a cumulative error of an inertial navigation system of said vehicle based on the determined geolocation of said vehicle.

17. The method of claim 1, wherein determining said geodetic position for each of said plurality of airborne objects further comprises:
- determining a pixel offset relative to a frame of said sensor for said first observed star and said first observed satellite to define an angle of elevation and an angle of azimuth for said first observed star and said first observed satellite;
- calculating a line of sight vector from said sensor to each of said first observed star and said first observed satellite;
- computing a sensor attitude triad based on said line of sight vectors for said first observed star and said second synthetic star;
- transforming the line of sight vector for said second synthetic star from a sensor frame to an Earth Centered, Earth Fixed (ECEF) frame based on the orientation of said sensor relative to said airborne object and said airborne object's attitude and position;
- calculating an ECEF vector to said first observed star based on ephemeris of said first observed star;
- computing an ECEF attitude triad based on said ECEF vectors for said first observed star and said second synthetic star;
- applying said rotation matrix based on said ECEF attitude triad and said sensor attitude triad to a line of sight vector from said sensor, to said first observed satellite to determine an ECEF vector to said first observed satellite; and
- determining said geodetic position of said airborne object by calculating an ECEF vector to said airborne object based on said line of sight vector to said first observed satellite and said ECEF vector to said first observed satellite.

18. The system of claim 8, wherein said processor of each airborne object is further configured to:
- determine a pixel offset relative to a frame of said sensor for said first observed star and said first observed satellite to define an angle of elevation and an angle of azimuth for said first observed star and said first observed satellite;
- calculate a line of sight vector from said sensor to each of said first observed star and said first observed satellite;
- compute a sensor attitude triad based on said line of sight vectors for said first observed star and said second synthetic star;
- transform the line of sight vector for said second synthetic star from a sensor frame to an Earth Centered, Earth Fixed (ECEF) frame based on the orientation of said sensor relative to said airborne object and said airborne object's attitude and position;
- calculate an ECEF vector to said first observed star based on ephemeris of said first observed star;
- compute an ECEF attitude triad based on said ECEF vectors for said first observed star and said second synthetic star;
- apply said rotation matrix based on said ECEF attitude triad and said sensor attitude triad to said line of sight vector from said sensor, to said first observed satellite to determine an ECEF vector to said first observed satellite; and
- determine said geodetic position of said airborne object by calculating an ECEF vector to said airborne object based on said line of sight vector to said first observed satellite and said ECEF vector to said first observed satellite.

19. The method of claim 13, wherein determining said geolocation further comprises:
- determining a pixel offset relative to a frame of said sensor for said first observed star and said first observed satellite to define an angle of elevation and an angle of azimuth for said first observed star and said first observed satellite;
- calculating a line of sight vector from said sensor to each of said first observed star and said first observed satellite;

computing a sensor attitude triad based on said line of sight vectors for said first observed star and said second synthetic star;

transforming the line of sight vector for said second synthetic star from a sensor frame to an Earth Centered, Earth Fixed (ECEF) frame based on the orientation of said sensor relative to said airborne object and said airborne object's attitude and position;

calculating an ECEF vector to said first observed star based on ephemeris of said first observed star;

computing an ECEF attitude triad based on said ECEF vectors for said first observed star and said second synthetic star;

applying said rotation matrix based on said ECEF attitude triad and said sensor attitude triad, to said line of sight vector from said sensor to said first observed satellite to determine an ECEF vector to said first observed satellite; and determining said geolocation information of said airborne object by calculating an ECEF vector to said airborne object based on said line of sight vector to said first observed satellite and said ECEF vector to said first observed satellite.

\* \* \* \* \*